Dec. 16, 1941.    W. S. McGOWAN    2,266,327
TIRE SPREADER
Filed April 7, 1939    2 Sheets-Sheet 2

INVENTOR
Wm. S. McGowan
BY
ATTORNEY

Patented Dec. 16, 1941

2,266,327

UNITED STATES PATENT OFFICE 2,266,327

TIRE SPREADER

William S. McGowan, Castroville, Calif.

Application April 7, 1939, Serial No. 266,611

2 Claims. (Cl. 154—9)

This invention relates to tire shop equipment and particularly to a tire spreader, by means of which the carcass of a tire may be spread at the beads for the inspection of the interior thereof.

The principal object of my invention is to provide a spreader having means to both support a tire in a vertical position and to impart rotation thereto about its axis, and a means to hold the tire spread adjacent its point of support and which will function irrespective of the rotation of the tire. In this manner, and with the use of a single pair of spreading units, the tire will be successively spread about its entire circumferential extent with a single revolution of the tire. Also, the point of spreading is always positioned so that the portion of the interior of the tire thus exposed is most convenient for visual inspection by the operator or a customer intending to purchase the tire.

The spreader is also arranged so that it is a very simple and easy matter to mount a tire on or remove the same from the spreader.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 3 is an elevation of one of the spreader levers.

Referring now more particularly to the characters of reference on the drawings, the spreader comprises a rectangular frame 1 disposed in a horizontal plane and adapted to be supported a desired distance from the floor by suitable means such as corner legs 2.

Figure 2:
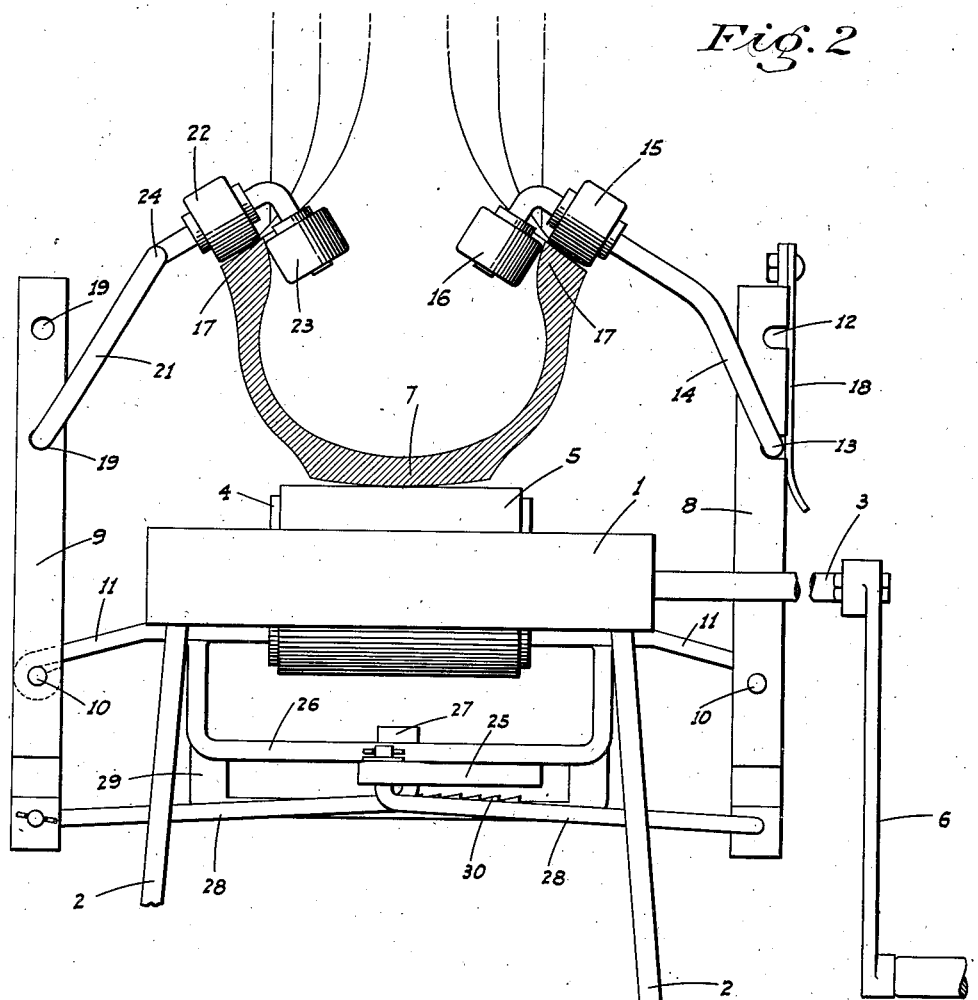
Figure 2 is an elevational view of the spreader from one end showing a supported tire, in section, as spread.

Turnably mounted in the frame are transverse shafts 3, spaced apart lengthwise of the frame, and supporting pulleys 4 on which is mounted an endless belt 5. One of the shafts is adapted to be rotated, to drive the belt, either by a hand operated crank handle 6 or by power as may be found best. The belt is of sufficient width and quite taut whereby its upper run provides adequate support for the tread of a tire 7, as shown in Fig. 2.

Disposed on opposite sides of and outwardly of the frame centrally between shafts 3 are upstanding levers 8 and 9 preferably of relatively wide loop-like form as shown in Fig. 3. Both levers are pivotally mounted intermediate their ends as at 10 on brackets 11 projecting laterally from the frame.

Turnably supported in either one of a pair of vertically spaced sets of seats 12 cut in the back or outer side of lever 8 is the cross rod 13 of a pair of parallel arms 14. These arms are adapted to overhang the belt and the tire supported thereon and each arm at its free end carries a roller 15 and another independently turnable roller 16 disposed laterally inward beyond and in depending relation to roller 15 at substantially right angles thereto. The rollers 15 are adapted to ride on the radially innermost edge of the adjacent tire bead 17, while the rollers 16 are adapted to engage against the surface of said bead inside the tire, as shown in Fig. 2. The cross rod 13 of the arm unit is releasably retained in either seat 12 by a spring keeper strap 18 mounted on lever 8 at the top and depending below the cross rod.

Figure 1:
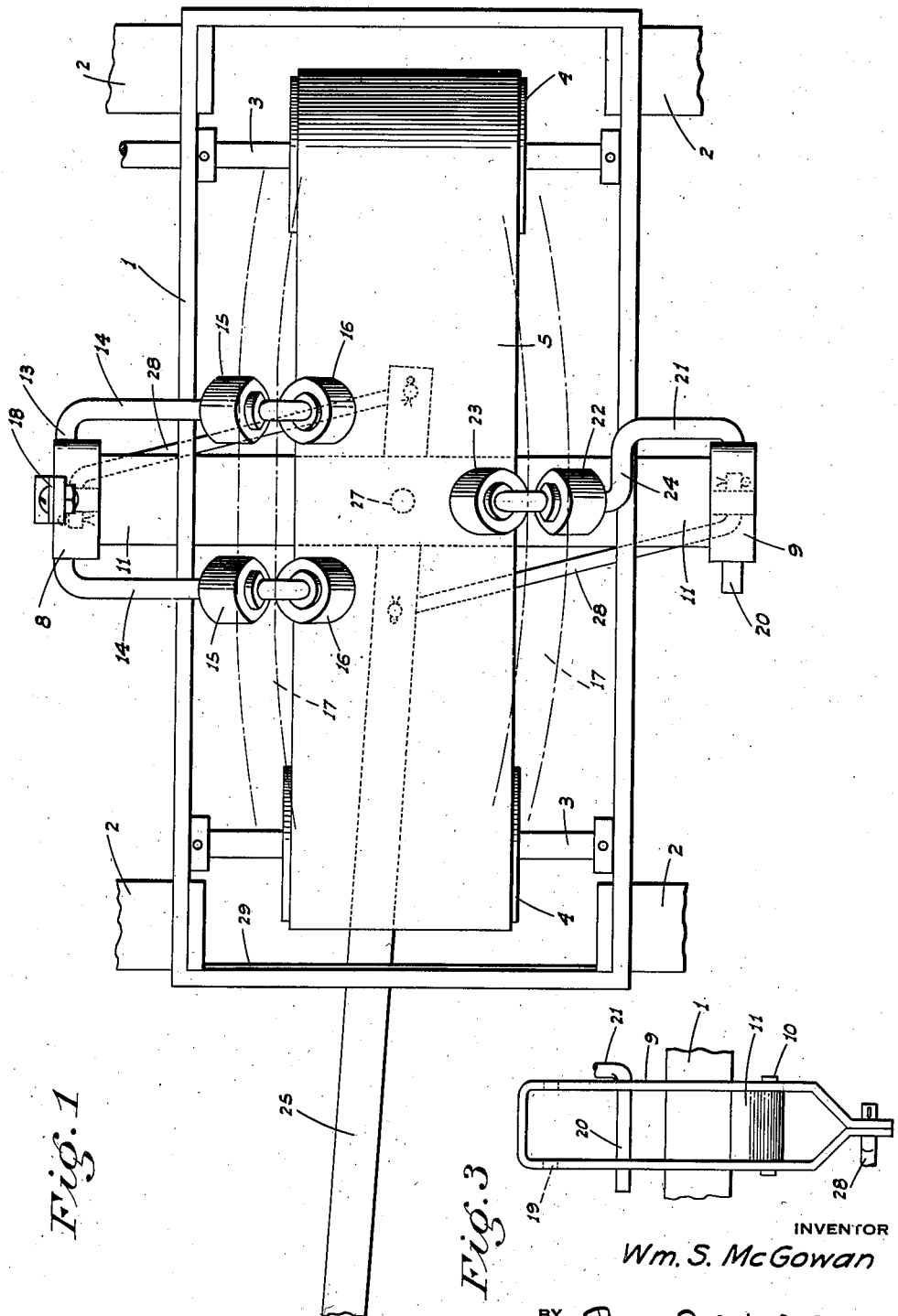
Figure 1 is a top plan view of the spreader, showing the spreading units in operative position but with the tire omitted.

The opposite arm 9 is provided with holes 19 spaced apart vertically the same as the spacing of seats 12, and either set of holes turnably and removably supporting a rod 20 formed on the outer end of a single arm 21. This arm is also adapted to extend laterally to overhang the belt and tire and on its free end carries rollers 22 and 23. These rollers are disposed in the same relation to each other as are rollers 15 and 16 respectively so as to similarly engage the adjacent bead. There is only a single pair of rollers 22 and 23 however, and so that they will not conflict with rollers 15 and 16 when initially engaging them with the tire, the arm 21 is formed intermediate its end with a bend parallel to rod 20 as at 24 so as to disposed rollers 22 and 23 midway between the pairs of rollers 15 and 16 as shown in Fig. 1. The axes of all the rollers lie in parallel planes transversely of the belt and tire.

Figure 4:
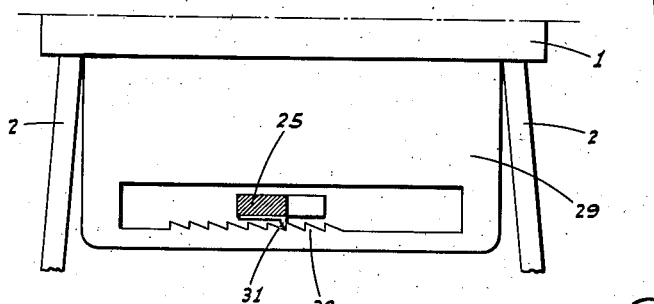
Figure 4 is a fragmentary view of the other end of the spreader, showing the control lever holding means.

In order to rock the levers 8 and 9 simultaneously so as to move their upper ends apart, horizontal operating lever 25 extends lengthwise of the frame below the belt and is pivoted under the frame on a cross bar 26 on the frame at a point in transverse alinement with and centrally between the arms 8 and 9 as at 27. Links 28 are connected to the lever at points on opposite sides of pivot 27 and to the vertical levers 8 and 9 at their lower end. The operating lever 25 projects for operation beyond one end of the frame, at which end the frame is provided with a slotted guide plate 29 through which the lever projects (see Fig. 4). The bottom of the slot is provided with teeth 30 to cooperate with a fixed dog 31 depending from the lever; the teeth and dog being arranged to hold the lever against return movement after it has been swung to spread the levers 8 and 9 apart the desired distance at their upper end.

In operation, the operating lever is first moved to a release position and the arms 14 and 21 are swung up and out of the way. The tire to be spread is then placed upright on the belt, and the two-arm unit is swung down and the rollers 15 and 16 thereon engaged with the adjacent bead of the tire. The arm 21 is then likewise swung down and the rollers 22 and 23 similarly engaged with the corresponding bead. The operating lever 25 is then manipulated to pull the roller supporting arms apart the necessary distance to properly spread the tire at the bottom. Such movement being the same for both arms, an equal spreading pressure is applied on both sides of the tire and the latter is maintained in an upright position.

The belt is then driven, which will rotate the tire, and since the spreading rollers occupy a fixed position relative to the belt, whatever portion of the tire is adjacent the belt will become spread as the tire is thus rotated, and thus the tire will be spread throughout its circumferential extent with one revolution of the same. The spread portion facing upwardly and below the eyes of the operator, such portion occupies the best position for convenient and proper inspection.

The purpose of the vertically spaced sockets 12 and holes 19 is to enable the roller supporting arms to be set at different levels, according to whether a tire of relatively small or large cross sectional size is to be spread.

When made in a size to handle large heavy tires, the links 28 may be pulled together by power means such as a hydraulic cylinder.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A tire spreader comprising an endless flexible driven belt whose upper run is flat and horizontal for the support of a tire, end rollers supporting the belt, and means mounted substantially centrally between the rollers to engage and spread the beads of the tire immediately above the belt and maintain the tire pressingly engaged with the belt between the rollers and with its axis parallel to that of said rollers; said upper run of the belt being relatively taut so as to resist said pressing engagement of the tire therewith.

2. In a tire spreader, an endless driven belt whose upper run is horizontal for the support of a tire, end rollers supporting the belt, and means mounted substantially centrally between the rollers to engage and spread the beads of the tire immediately above the belt and to maintain the tire pressingly engaged with the belt between the rollers and with its axis parallel to that of said rollers; said means comprising bead spreading units on opposite sides of the supported tire, one of said units including a pair of parallel arms, the other unit including a single arm disposed on the opposite side of the tire in a plane centrally between said pair of arms, one roller turnable on each arm to engage the radially inner edge of the adjacent tire bead, and another roller turnable on each arm at an angle to said one roller to engage the bead surface inside the tire.

WILLIAM S. McGOWAN.